United States Patent
Prinoth et al.

(10) Patent No.: US 7,140,038 B2
(45) Date of Patent: Nov. 21, 2006

(54) SECURITY SERVICE LAYER

(75) Inventors: Rainer Prinoth, Frankfurt a Main (DE); Horst Ehmke, Seeheim-Jugenheim (DE); Elisabeth Giessler, Griesheim (DE); Thomas Schroeder, Darmstadt (DE); Markus Schumacher, Lorsch (DE)

(73) Assignees: GMD - Forschungszentrum Informationstechnik GmbH, Sankt Augustin (DE); Fujitsu Limited, Kawasaki (JP)

( * ) Notice: Subject to any disclaimer, the term of this patent is extended or adjusted under 35 U.S.C. 154(b) by 857 days.

(21) Appl. No.: 09/858,900

(22) Filed: May 17, 2001

(65) Prior Publication Data

US 2002/0019931 A1    Feb. 14, 2002

(30) Foreign Application Priority Data

May 17, 2000    (DE)    ............... 100 24 347

(51) Int. Cl.
*G06F 17/00*    (2006.01)
(52) U.S. Cl. .................. 726/6; 726/4; 726/5; 726/3
(58) Field of Classification Search ........ 713/200–202; 726/1–36, 4, 5, 6, 3
See application file for complete search history.

(56) References Cited

U.S. PATENT DOCUMENTS 5,537,542 A    7/1996 Eilert et al.

FOREIGN PATENT DOCUMENTS

JP    08-252 177 A1    9/1996

OTHER PUBLICATIONS http://webservices.xml.com/pub/a/ws/2003/03/04/security.html.*
http://webservices.xml.com/lpt/a/ws/2001/04/04/webservices/index.html.*
http://webservices.xml.com/pub/a/ws/2003/09/30/soa.html.*
http://webservices.xml.com/pub/a/ws/2003/04/01/security.html.*
http://webservices.xml.com/pub/a/ws/2003/05/13/security.html.*
http://webservices.xml.com/pub/a/ws/2003/07/22/security.html.*
http://webservices.xml.com/pub/a/ws/2003/01/15/ends.html.*
ftp://www6.software.ibm.com/software/developer/library/ws-secmap.pdf.*

(Continued)

*Primary Examiner*—David Jung
(74) *Attorney, Agent, or Firm*—Staas & Halsey LLP

(57) ABSTRACT

A security service layer and method for controlling a communication between a client running an application and a target wherein a message including parameters specifying the communication is analyzed and, based on the analyzing result, at least one service routine is selected from a number of available service routines. The communication is then controlled on the basis of the selected service routines. The client and the application running at the client may be security unaware since all security relevant functions are executed on behalf of the application by the service security layer. Application dependent service routines are selected dynamically during the communication between the client and the target. A service routine may include security mechanisms or support mechanisms, such as data handling.

21 Claims, 4 Drawing Sheets

OTHER PUBLICATIONS http://www.cs.ucl.ac.uk/staff/W.Emmerich/lectures/ds98-99/dsee7.pdf.*
Zimmerman, PGP User's Guide, 1996, Preface Section and Quick Overview Section.*
Transport layer security protocol in Telnet; Mahmood, H.B.; Communications, 2003. APCC 2003. The 9th Asia-Pacific Conference on vol. 3, Sep. 21-24, 2003 pp. 1033-1037 vol. 3.*
A new secure session exchange key protocol for wireless communications; Badra, M.; Serhrouchni, A.; Personal, Indoor and Mobile Radio Communications, 2003. PIMRC 2003. 14th IEEE Proceedings on vol. 3, Sep. 7-10, 2003 pp. 2765-2769 vol. 3.*

An IP-layer anonymizing infrastructure; Kung, H.T.; Bradner, S.; Tan, K.-S.; MILCOM 2002. Proceedings vol. 1, Oct. 7-10, 2002 pp. 389-394 vol. 1.*

Distributed Object Computing with CORBA Middleware.

Chizmadia, David, CORBAsec: Securing Distributed Systems, Jun. 1999.

Office Action from the German Patent and Trademark Office, for corresponding application, issued Nov. 29, 2005.

* cited by examiner

SECURITY SERVICE LAYER

TECHNICAL FIELD

The invention relates to a security service layer for controlling a communication between a client running an application and a target via a communication channel. The invention further relates to a method of controlling a communication between a client running an application and a target via a communication channel.

BACKGROUND OF THE INVENTION

Increasing numbers of security relevant communications and transactions are performed making use of today's communication networks. For example, an increasing number of bank transactions is carried out using worldwide data networks, allowing a user to be located independent of the location of the servicing institution. However, as a matter of fact, these international data networks may generally be accessed by anybody for any purpose and therefore data transactions such as the above banking transactions must be secured from unauthorized reading or deciphering of messages, passwords, acknowledgements and similar exchanged in connection with a transaction. The same may apply to e.g. subscribers of mobile phone services, accessing personal subscriber data over a network, research institutions exchanging data, or customers submitting credit card information over a network for purchases.

Many different approaches for securing data transmission via public networks are available, including, e.g., passwords, encryption and access control for example at a target server allowing only limited access and/or a limited set of actions allowed after access. However, the number of different types of available and necessary security measures and the number of different entities using different applications communicating over today's networks requires a substantial programming overhead when designing applications requiring security sensitive data transmissions over a network.

A security relevant data transmission over the network could be construed to follow the following steps.

An application running at a client server and planning to access a target (running at a server, e.g. at a bank office), which preferably is also executing an application, generates a message for transmission from the client to the server. As this message needs to be protected from unauthorized reviewing, the message will be encrypted for transmission and further, at the target certain access rights will be set in dependence on the application and the type of communication.

For a successful data transmission the application running at the client and the server must use, for example, the same set of encryption/decryption tools and therefore, the application at the client and the application used for receiving and processing the transmitted data at the target need to be adapted to each other. This however poses the problem that any type of application accessing a server or target needs to be fully compatible, including security aspects, with the software at the server. In case a large number of applications is designed to access the server, considerable programming efforts are necessary in order to keep the software at the server compatible to all applications.

To secure management applications in a distributed environment is one of the challenges designers and programmers of management applications have to take up and it is desirable to separate application specific routines, serving a transmission of information from the application to a server and security relevant activities, so that each group of activities may be executed by different entities of the system.

A number of different approaches to group application relevant actions and security relevant actions in a data communication over a network have been proposed, one of which is CORBA (Common Object Request Broker Architecture), as for example described in "CORBA", Object Management Group, The CORBA Security Service Specification (Version 1.5), December 1998.

CORBA is a distributed platform layer available at entities communicating over a network, e.g., at a client and at an target. CORBA allows the execution of a number of service routines during a communication between a client running an application and a target or server, preferably also executing an application. Upon access by the client, the CORBA distributed layer invokes a predetermined set of security activities to be executed in connection with data transmitted from the client. This may include security association, access control, message protection, audit and similar. At the target side, the CORBA layer allows the execution of corresponding security activities in order to allow a successful data transmission from the client to the target. This may include, as before at the client, security association, access control, message protection, audit and similar.

The security or support activities executed by the CORBA layer are only invoked at access time, i.e., at a time the client accesses the network for a data transmission session. Further, security activities executed by CORBA are only dependent on the client but not designed to be dependent on a particular application, i.e., the security activities invoked are independent from the type application or communication the client is executing. For example, specific service routines related to a transfer of security relevant data to a bank (or from a bank server to a customer) or a transmission request from a client to a server of a telecommunication service, for retrieving subscriber relevant data, are not supported by CORBA.

With CORBA the application itself has to execute further security relevant functions concerning the application itself or the data transmission performed, including, e.g., access control, non-repudiation, audit, delegation and similar. Further, the target (also running an application) receiving a data transmission from the client application has to execute corresponding security activities, e.g. including target application access control, non-repudiation, audit, delegation and similar.

FIG. 5 shows a security service arrangement including a client 200, a target 210 and a distributed layer 220, e.g. a CORBA Common Object Request Broker Architecture layer. The client is running an application 201, and the target may run a corresponding application 211. As described above, in this scheme on one hand the distributed platform layer and on the other hand the client and the target execute security relevant activities, wherein the activities at the distributed platform layer level are application independent and the security activities executed at the client and at the target are application dependent security activities.

Even though this architecture provides an advantage over the initially described basic system, wherein all security or support relevant activities are performed at the client, more specifically, by the application running at the client, and at the target, i.e., the software or application running at the target and receiving the message from the client application, security or support relevant activities still need to be executed by the application running at the client and possibly at the application running at the target. In other words, security or support activities depending on the client accessing the network are moved from the application to the distributed platform layer constituting part of the network, while service or support routines dependent on the application running at the client (and target) remain on an application level.

Therefore, there is still a disadvantage with the system described with respect to FIG. 5, and security or support relevant aspects must be still treated by applications, still involving considerable programming efforts.

Because of the complexity of handling security measures it is desirable to put a specific component in charge of all security measures needed to run a management application in a secure manner.

SUMMARY OF THE INVENTION

It is object of the invention to provide an improved system and method for controlling a communication between a client running an application and a target via a communication channel, requiring reduced programming overhead when designing applications or application tools.

This object of the invention is solved by a security service layer means, or unit, for controlling a communication between a client running an application and a target via a communication channel.

This object of the invention is further solved by a method of controlling a communication between a client running an application and a target via a communication channel.

The invention advantageously allows applications to run at a client side without attending to security relevant issues, i.e., allows a security unaware running of the application at the client and at the target. Further, the invention allows applications to run without attending to support activities which are not security related. The security service layer acts on behalf of an application and allows the application to be security unaware and/or support unaware.

The invention advantageously allows to dynamically select an appropriate service policy from a service policy manager providing all service functions needed. This may include security and/or support activities. In doing so, the invention allows to access and control the security and/or support functions, e.g., offered by further underlying security and support tools.

The security service layer means, or unit, of the invention may advantageously further comprise a client side selection means, or unit, located at the client side and connected to a first database storing service routines available at the client, a target side selection means, or unit, located at the target side and connected to a second database storing service routines available at the target, wherein the selection of at least one service routine is based on the availability of service routines at the client and at the target, the availability being determined in a negotiation between the first and second selection means, or units, prior to transmission of the message.

The control means, or unit, may further comprise a client side control means, or unit, located at the client side, and a target side control means, or unit, located at the target side.

The selection means may be arranged for selecting the at least one service routine from a group of application independent service routines and application dependent service routines.

The parameters may specify at least one of the client, the target and the application type.

A service routine may include at least one of security mechanisms and support mechanisms not related to security.

The service routines may relate to controlling at least one of an interface, access to the target, and execution of a processing method.

Further, the service routines may relate to encoding and decoding the message to be transmitted from the client to the target.

The service routines may include information relating to the service routine itself, including lifetime and version.

The message means, or unit, may constitute part of the application executed at the client, and the message may constitute a request or a notification.

Further, advantageous features of the invention are disclosed in further dependent claims.

DETAILED DESCRIPTION OF PREFERRED EMBODIMENTS

In the following, the embodiments of the invention are described with respect to FIGS. 1–4.

In the following, with respect to FIG. 1 a first embodiment of the invention is described.

Figure 1:
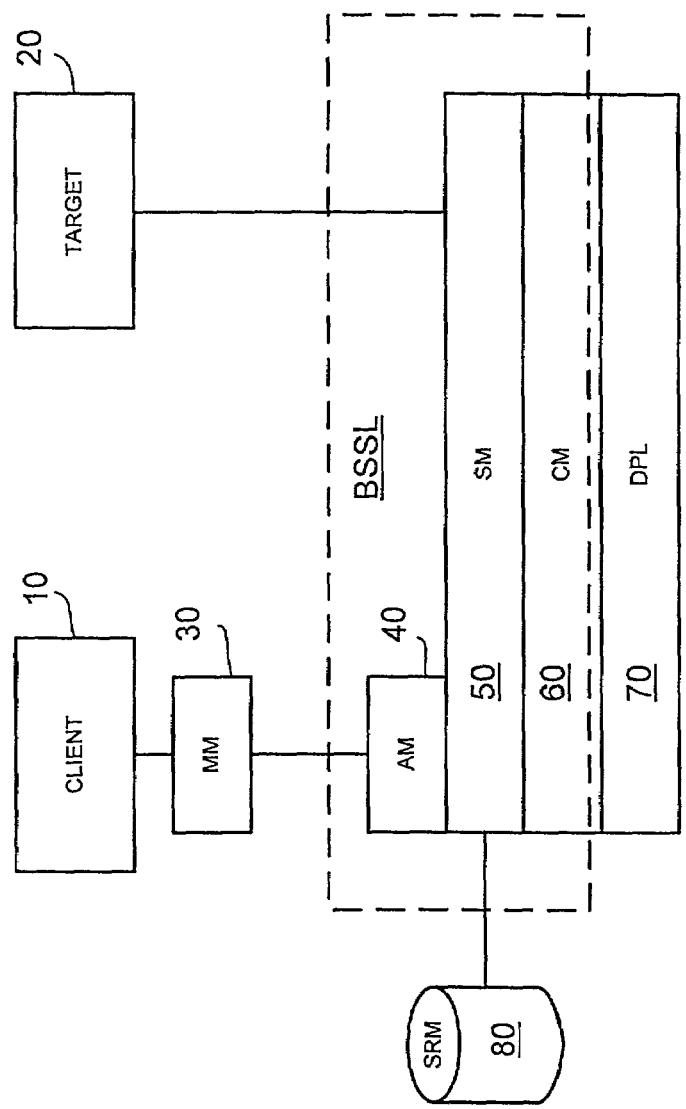
FIG. 1 shows a block diagram of the invention according to a first embodiment.

In FIG. 1, reference numeral 10 denotes a client, which may be constituted by a user of telebanking services, e.g. a subscriber of a telecommunications service, or generally any user of a data service. The client 10 is running an application in order to communicate with a target 20 in a communication session, e.g., for sending a message, notification, request and similar. The target may be a banking server or telecommunication service server and will preferably also run an application for communicating with the client side application. It is also possible that parts of a distributed application are running at the client 10 and the target 20. During the communication, e.g., when the target is responding to a request with an acknowledgement, the target may assume functions of the client and the client may assume function of the target. The target may be a server of an accessed system or any responding data processing means.

As can be seen in FIG. 1, the client 10 is connected to message means 30 for generating a message for transmission from the client to the target, the message including at least parameters specifying the communication and application running at the client. It is also possible that the application assumes functions of the message means 30 and generates the message itself. The message may constitute a request or a notification, e.g. for retrieving data from the target or for transmitting data from the client to the target.

The message means 30 is connected to analyzing means 40 for analyzing the parameters of the message to be transmitted from the client to the target 20 via a physical communication channel or an air interface. Means for connection between the message means 30 and the analyzing means 40 may, e.g., be a local area network or similar.

The analyzing means is connected to selection means 50, for selecting at least one service routine from a number of available service routines based on the parameters. The service routines may, e.g., be selected from an external service routine memory 80 or any other data base.

A service routine may specify security relevant mechanisms, including security relevant instructions to further entities, e.g. an underlying communication layer. Further, a service routine may specify support mechanisms or instructions not related to security mechanisms, such as data handling and similar. A service routine may specify security and support related activities at the same time.

The selection means 50 is connected to control means 60 and a distributed platform layer 70 used to control the communication including transmission of the message based on the selected at least one service routine. Further, the selection means 50 may be connected to the database 80 for storing a number of available service routines either directly or through a network, including the distributed platform layer 70.

The selection means 50 and the control means 60 may be distributed layer means, like the distributed platform layer 70. In other words, entities of the selection means 50, the control means 60 and the distributed platform layer 70 may be located at the client side and at the target side, connected by a physical transmission medium.

In FIG. 1, the box denoted by reference numeral 100 contains the main entities of the security service layer means of the invention.

The security service layer according to the invention is arranged for controlling a communication between a client 10 running an application and a target 20, preferably also running an application. In order to avoid the execution of security relevant routines on the application level, according to the invention the execution of security relevant routines and/or support relevant routines is allocated to a layer which is interposed between the client and the actual transmission layer or medium, and likewise between the target and the actual transmission layer or medium, respectively.

The actual transmission layer may for example be CORBA (Common Object Request Broker Architecture), DCOM, OSF DCE etc. or any other available distributed platform layer.

The security service layer of the invention is arranged to receive a message from the message means or an application and to analyze the parameters of the message, wherein the parameters may specify at least one of the client, the target, the application type, and a communication type. Based on the analyzing result obtained by the analyzing means 40, the selection means, or unit, 50 proceeds to select at least one service routine from, e.g. a database storing a number of available service routines. Since the service routines are selected dynamically upon reception of a message during the execution of an application, the selection of service routines may be dependent on a current execution state of the application, e.g., with respect to a particular data transmission, request and similar.

It is possible that a single service routine is selected upon a particular message or that a set of service routines is selected.

The routines may be application dependent service routines, i.e. routines which depend on an application, the state of the application or a particular application communication scheduled by the application. Further, the service routines may be application independent service routines, e.g. only depending on the client. Application dependent service routines and application independent service routines may be selected together.

Upon retrieval of one or a plurality of service routines from the database 80, the control means, or unit, 60 proceeds to control the communication between the client 10 and the target 20, including transmission of the message from the client to the target. The service routines may relate to controlling an interface, access to the target, or execution of a processing method as for example encoding and decoding the message to be transmitted from the client to the target. This may involve also security relevant activities or support activities, such as data handling. A single service routine may thus relate to security mechanisms or support mechanisms, or both to security mechanism and support mechanisms. Security and support mechanisms may itself include algorithms for processing or instructions related processing by different entities, e.g., executed by a lower communication layer.

In order to have effective security and/or support provisions, the service routines are preferably executed at the client side prior to transmitting the message from the client to the target. Further, at the service routines are also executed the target side, or corresponding parts of the service routines, for example a decryption algorithm, e.g. for controlling access to the target or decoding data or messages from the client, or data handling. In order to allow secure transmission and access to the target, the service routines are preferably available at both the client and the target. Upon selection of the service routines based on the analyzing result from the analyzing means 40, the service routines may be executed at both the client and the target. The service routines may be retrieved independently both at the client and the target, such that they do not have to be transmitted in association with the communication established between the client and the target.

The invention allows that the client and the application running at the client may be security unaware, and/or also support unaware, since all security and/or support relevant functions may be executed on behalf of the application by the analyzing means 40, selection means 50 and control means 60 based on the message generated by the message means 30, specifying the application, the client, the target, the type of communication and similar.

An application is security-aware if it actively participates in providing security for data it uses or it manipulates the environment to adapt environment-based security controls to its needs. An application is security-unaware if it does not actively participate in providing security for data it uses nor does it manipulate the environment to adapt environment-based security controls to its needs.

It is one purpose of the invention to hide security from management applications. A basic service security layer is acting on behalf of the application, thus allowing the application to be security unaware and eliminating any need to contact the application or the customer who is running the application. When running an application, the service security layer thus may select an appropriate service policy through a service policy manager and should provide all security and/or support functions needed. In doing so, the basic service security layer will access and control the security functions offered by underlying security/support tools. The basic service security layer interacts with application entities at the client side or target side an underlying distributed platform and a ervice policy manager.

Similarly, the invention may hide support activities from the application.

As discussed above, the basic service security layer (BSSL) has to communicate with the service policy manager (SPM), which hides the access to the service policy/routine data base to get the service routine required. Further communication will arise from accessing a naming service. In OrbixWeb, (Adiron, ORBAsec SL2 User Guide) the BSSL functionality may be implemented using interceptors, i.e. using objects which provide one or more specialised services, at the ORB invocation boundary, based upon the context of the object request. An advantage of this type of implementation lies in the fact, that management application entities need not to be altered when relying on the BSSL functionality. Using interceptors for implementation purposes requires that both communication partners provide this concept.

In case a naming service is used, the client requests the server name from the naming service and at invocation time, the BSSL requests the SPM name from the naming service, and afterwards, requests a security policy from the security policy manager.

The following steps may be executed:
1. The client invokes a message to the target or server, which is stopped at the client's BSSL interceptor.
2. The BSSL inquires an object reference of the SPM from the naming service.
3. The BSSL gets the object reference of the SPM.
4. The BSSL inquires at least one service routine from the SPM.
5. The BSSL gets the at least one service routine from the SPM. Afterwards, a secure session is established by the BSSL in accordance with the at least one service routine and, finally the message is transferred to the server.

Implementation of the system and the application may be achieved in the Java programming language. The underlying platform may be Windows NT. The service routines used may be derived from the TMF document "Peer-to-Peer Service Configuration Business Agreement", Issue 1.0, 1997.

The service routines can specify security requirements at different levels of granularity, e.g., security and/or support requirements at interface level or a method level, and may include information on the service routines itself, as lifetime, version, etc.

The invention allows to provide security to interconnections between service management applications, i.e. the application running at the client and at the target. When two management applications or parts of a distributed management application are connected with each other, the following kinds of security activities may be needed:
Authentication: the applications should know to whom it tries to connect or to be connected.
Authorization: the connection must be authorized, or otherwise it must be disallowed.
Integrity: the applications should be able to sure that the message delivered is come from the peer entity and not changed by other entities.
Confidentiality: the message delivered should be encrypted; in other words, the messages should not be seen by unauthorized entities in the way of the communication.
Audit: security-sensitive events such as a security violation or a delivery of an important message should be recorded and ready to be audited.
Non-repudiation: an evidence of a delivery (sending and receipt) of an important message should be recorded for non-repudiation.

These are particularly important in case of an interconnection between different organizations and in case of business.

Since not only static service activities may be executed but also application dependent service routines, and even service routines relating to the type of communication or data transmission, or the type of data transmitted from the client to the target, or relating to support functions, a high level of adaptation of the system with respect to security requirements may by achieved.

Figure 2:
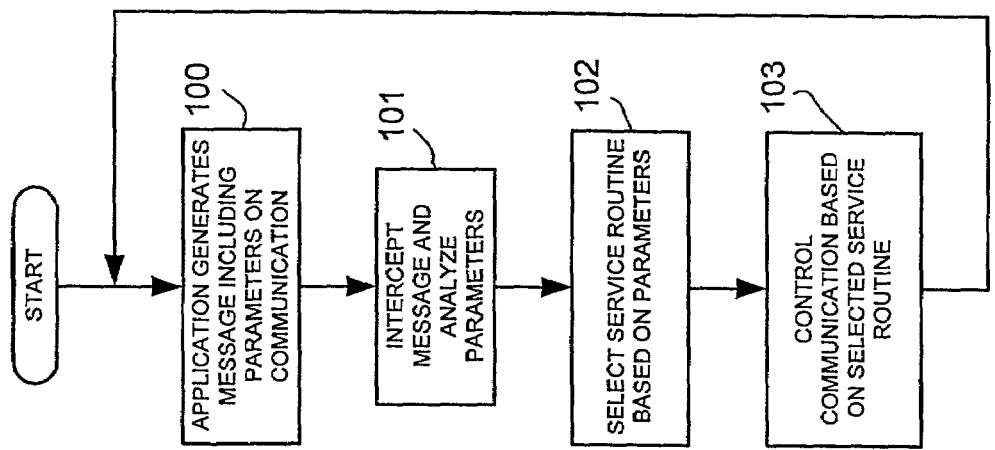
FIG. 2 shows a flow diagram of steps executed during a communication between a client and a target according to the first embodiment.

In the following, with respect to FIG. 2 a possible sequence of steps for controlling a communication between a client 10 running an application and a target 20 via a communication channel is described.

In a first step 100 the message means 30 or directly the application may generate a message including parameters on the communication, parameters on the client, the target and the application type, the type of data to be transmitted, the type of notification or request. It is important that the message includes all parameters significant for selecting service routines, as this is the only information transmitted from the client to the service security layer.

In a second step 101 the message is intercepted at the analyzing means 40, where the message is analyzed and the parameters are retrieved. Information on the parameters retrieved from the message is subsequently transmitted to the selection means 50 and, in a step 102 at least one service routine is selected based on the parameters. The service routines may be selected from a database storing a number of available service routines, including application dependent service routines and application independent service routines.

The selected service routines are retrieved, and in a step 103 the communication is controlled based on the selected at least one service routine. Since the invention allows to select application dependent service routines, a dynamic adaptation of the system to the application, data to be transmitted or similar may be achieved. The control means 60 may be used to instruct the distributed platform layer 70 to execute a certain set of activities associated with the service routines or may itself perform activities in connection with the selected at least one service routine.

Since the security service layer according to the invention may be interposed in existing communication models between client and target on one side and a distributed platform layer on the other side, such as the CORBA layer, existing architectures may be modified so as to be enhanced using the invention.

In the following, with respect to FIG. 3, a second embodiment of the invention will be described.

Figure 3:
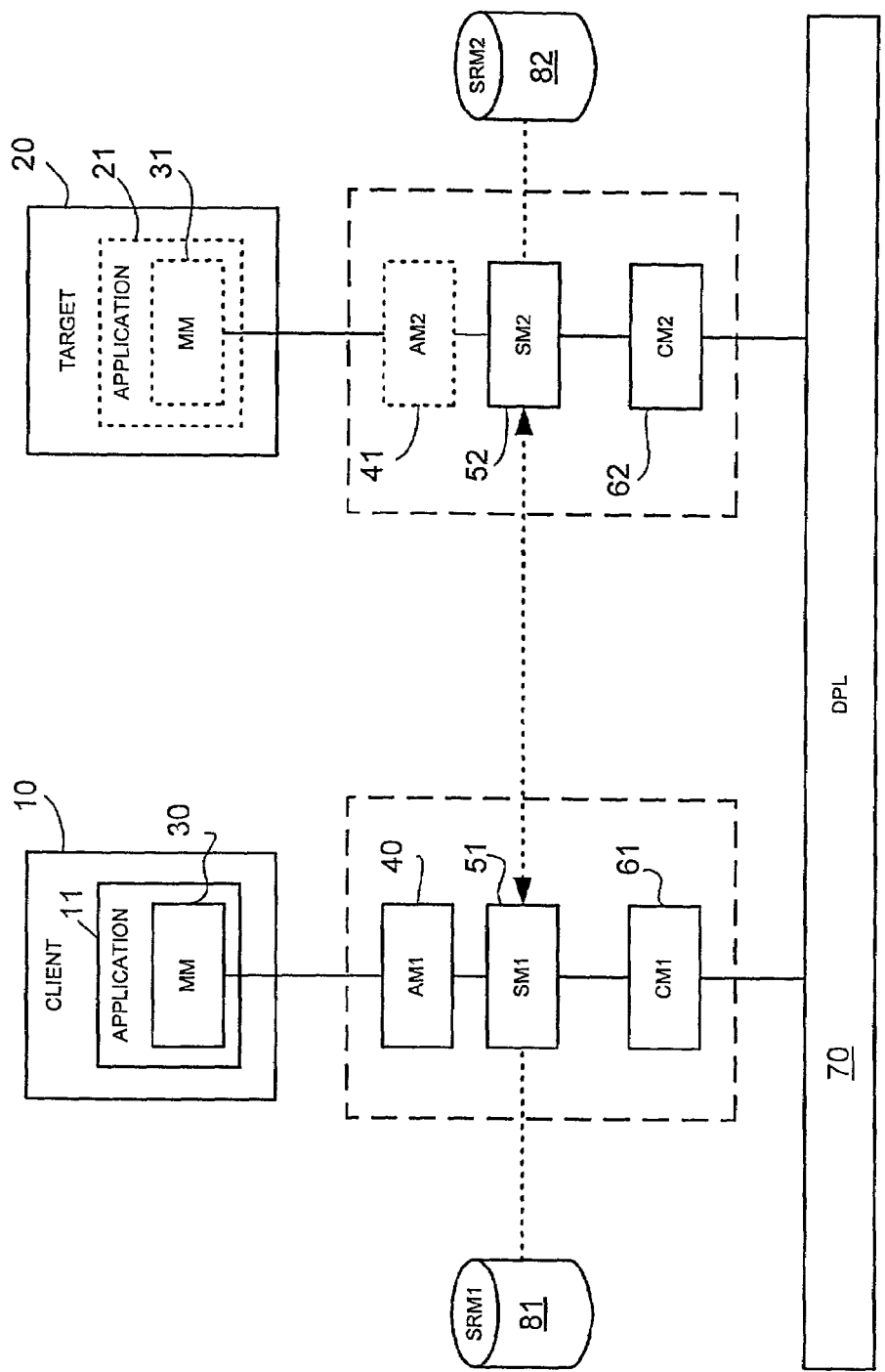
FIG. 3 shows a block diagram of a second embodiment of the invention.

In FIG. 3, reference numerals corresponding to reference numerals in FIG. 1 describe corresponding entities. As in the first embodiment a client 10 and a target 20 are involved in a communication via a communication channel. The client 10 is connected to a platform layer 70, such as CORBA or any other platform layer. Between the client functional entities of the security service layer are arranged, analyzing means 40, client side selection means 51, and client side control means 61. The box denoted 110 comprises the key components of a client side part of the distributed security service layer.

In FIG. 3, the client 10 is running an application denoted 11. This may be any application initiating a communication to the target, e.g., a management application or similar. The target preferably runs a corresponding application or, the target and the client run parts of a distributed application.

The application 11 in this particular embodiment assumes functions of the message means 30 for generating a message, i.e., the message means 30 may constitute part of the application 11 running at the client 10. The messages preferably include a parameter header and payload data, the header including parameters specifying the communication, such as the client, the target, the application type, and particular data type to be transmitted in the communication session. The message may be generated upon a notification, request or similar for the target.

The message generated at the client, as before, will be transmitted to the analyzing means 40, where it is intercepted and where the parameters directly or indirectly included into the message are retrieved.

The parameters are transmitted to the client side selection means 51 having access to a client side service routine memory 81, either directly or through the distributed platform layer or any other network component. The client side selection means 51 selects at least one appropriate service routine from the client side service routine memory 81 and transmits information on the selected at least one service routine to the client side control means 61. This may involve the parameters retrieved, a sequence number of the selected service routine or routines or any other information, including the routine itself.

The selected service routines may be application dependent or application independent, may relate to security and/or support activities, and are preferably dynamically selected upon generation and transmission of the message.

At the target side a box with the reference numeral 120 includes the key components of the service security layer at the target side, including target side selection means 52 and target side control means 62. The target 20 is connected through target side selection means 52 (and) target side control means 62 to the distributed platform layer 70. As on the client side, the target side selection means 52 has access to a target side service routine memory 82, either directly, via the distributed platform 70 or any other network component.

It is noted that in the above process a single data processing apparatus may assume functions of the client and at the same time functions of the target.

Upon selection of the at least one application dependent or application independent service routine a the client side, the target side selection means 52 is informed on the selection performed. This may involve a transmission of the parameters retrieved, a sequence number of the selected service routine or routines or any other information, including the routine itself. At the target side the target side selection means 52 selects and retrieves the same service routines as at the client side. The selected service routines are transferred to the target side control means 62.

The client side control means and target side control means, upon receiving the selected at least one service routine control the communication based thereupon, i.e., the client side control means 61 and the target side control means 62 will control the communication between the client and the target in accordance therewith. Preferably, the message to be transmitted from the client to the target is only transmitted after the necessary service routines were not only selected at the client side but also selected at the target side. However, it is also conceivable that the message is transmitted before a corresponding selection of service routines is performed at the target side and the message is intercepted at the target side and buffered until the selection of the service routines at the target side and the instruction of the target side control means were completed.

This control may include driving an interface, accessing the target, setting access rights and execution of a processing method, such as encoding the message to be transmitted from the client to the target.

The client side control means and target side control means may either itself perform security and/or support relevant functions in connection with the selected service routines or may instruct the underlying distributed platform layer 70 to execute the corresponding security/support functions.

Preferably, the message is intercepted at the client side and is only transmitted from the client to the target or the activity in association with the message is only executed after the appropriate service routines were selected at both the client side and target side and corresponding control activities commenced.

The target side service routine memory and the client side service routine memory may be a database or any other storage means for storing a number of application dependent and application independent service routines available at the (client and) target.

Further, the service routines may include information relating to the service routine itself, such as lifetime version and similar of the selected service routine.

In a further embodiment, instead of client side service routine memory and target side service routine memory only one service routine memory is available and the client side selection means 51 and the target side selection means 52 may have access to this single service routine memory. In this case the service routine memory may be connected, e.g., to the distributed platform layer or any other network which may be accessed from the client side and the target side and the target side selection means 52 is notified by the client side selection means 51 on the selection of service routines made in accordance with the parameters of the message. The target side selection means 52 will then proceed to retrieve the same service routines from the service routine memory.

It is also conceivable that at least part of the message concerning the parameters included is transmitted to the target side, particularly to the target side analyzing means, which will then analyze the message part and, based thereupon, select the service routines from either the target side service routine memory or a service routine memory common for both the target side and the client side.

As outlined before, the communication between the client and the target may involve transmission of the message, possibly in encrypted form, controlling an interface, access rights to the target, and similar.

In a further embodiment, the client side selection means 51 and the target side selection means 52 may base the selection of the at least one service routine, which may be an application dependent or application independent service routine, on the availability of service routines at the client and further, on the availability of service routines at the target. This is particularly important in a case where both, the client side selection means 51 and the target side selection means 52 are connected to different service routine memories, e.g., as shown in FIG. 3 the client side service routine memory 81 and the target side service routine memory 82, respectively and may thus not have the same set of service routines available.

Accordingly, the selection of the at least one service routine may be based on the availability of service routines at the client and at the target, the availability being determined in a negotiation between the client side selection means 51 and the target side selection means 52 prior to transmission of the message.

However, negotiation of selection of service routines is also relevant in case both selection means have access to the same service routine memory.

The selection of the mutually available service routines may be achieved in a negotiation between the client side selection means 51 and the target side selection means 52. In this negotiation an appropriate set of service routines mutually available will be agreed upon and this set of service routines, or corresponding aspects of the respective service routines will be used at the client and at the target.

The negotiation of a service routine may comprise the agreement between client-BSSL entity and target-BSSL entity upon a service routine, e.g. in cases that a set of service routines has been selected in the determination phase rather than a single service routine and/or in cases that ambiguities within a service routine have to be resolved.

At the end of the negotiation phase a complete agreement must be achieved on the following items:
the set of security features to be provided, and
the kind how they are provided.

The functionality of the BSSL may thus comprise:
the determination of the service routine depending on the application type and the communication relationship (client, target),
the negotiation of the service routine between the BSSL-entities, and
the enforcement of the service routine which includes
the mapping of the service routine to security components, and
the control and exception handling of this components.

After a set of service routines has been agreed upon in a communication between the client and the target, for following messages this set of service routines may be used. Only in case the execution state of the application or the type of communication changes, a message will be analyzed for defining a new set of service routines.

Still further, during a communication the client and the target may change rolls, that is, after a notification or request, the target may become client and the client may become target. As can be seen in FIG. 3, the target may run an application 21, shown with broken lines and may also comprise target side message means 31 also shown with broken lines and target side analyzing means 41. In case the target acts as the client, e.g., when transmitting an acknowledgement or similar to the client acting as target, the generated message will be analyzed at the target side analyzing means 41, appropriate service routines will be selected as described before, and further, the control of the communication between the target and the client will be controlled also as described before.

The set of service routines agreed upon may remain invariant as long as the communication fundamentals do not change.

In the following an example of a possible sequence of messages between the client and the target will be described, in case a naming service is utilized.

First a target side bootstrapping sequence of the BSSL is described. An operator may have to trigger the usage of the BSSL explicitly In the beginning, i.e., has to register with the naming service. After that the BSSL entities can use a SPM interface remotely. Generally it is possible to have more than one SPM. In that case the BSSL entities must know which SPM is assigned to them.

The server application entity then registers with the naming service too. This call is intercepted by the server BSSL entity which now initializes its environment: It does register itself with the naming service which is also done according to the described naming schema. Then it resolves the SPM address in order to be able to request service routines later. After that the intercepted call of the server application entity is continued.

In the following an example of a client side bootstrapping sequence of the BSSL is described. The operator may have to trigger the usage of the BSSL explicitly. As an example this can be achieved with special command line arguments.

In the beginning, the service routine memory has to register with the naming service. After that the BSSL entities can use the SPM interface remotely. Note that it is generally possible to have more than one SPM. When the client application entity resolves the server application entity from the naming service this message is intercepted by the client BSSL entity. That way the client BSSL entity can determine the address of the server BSSL entity that is derived from a unique naming scheme as described before.

After that the operator (at client side) authenticates himself. As the client application and the client BSSL entities may share the same address space this information can be accessed by the BSSL in order to perform the initial principal authentication.

After the initialization of both the middleware and the BSSL the distributed application or the separate applications at the target and client sends the first message. As for all other messages, this message is intercepted by the BSSL. This message may now determine the appropriate service routines. In order to do that the client BSSL entity now resolves the address of the SPM and the server BSSL entities. Knowing the username, the application type and the target domain, the client BSSL now sends a service routine request message to the SPM. If the parameters match, i.e. there is a valid service routine, it is returned to the caller. Otherwise an exception is raised and the message from the client to the server application will be discarded.

If the service routine request message has been successful the client BSSL entity sends a negotiate service routine message to the server BSSL entity with the identity and the version number of the service routine it has received from the SPM. The server BSSL entity checks if the values of these parameters are identical to its own determination of a service routine. If they match, it will indicate to proceed, else it will signal that the service routine is not accepted. In general these steps could be repeated as long as the client and the server BSSL agree on a common service routine or set of routines.

After the determination and the negotiation of the service routine, the BSSL enforces the security settings which are specified by the service routine. This is dependent on the underlying security components.

All messages between client and server application entities are intercepted by the client and server BSSL entities. After the enforcement of the service routines by the BSSL entities, the current message has been passed to the server BSSL entity, the BSSL handles any exception that may have occurred. Finally the message is passed to the target.

Figure 4:
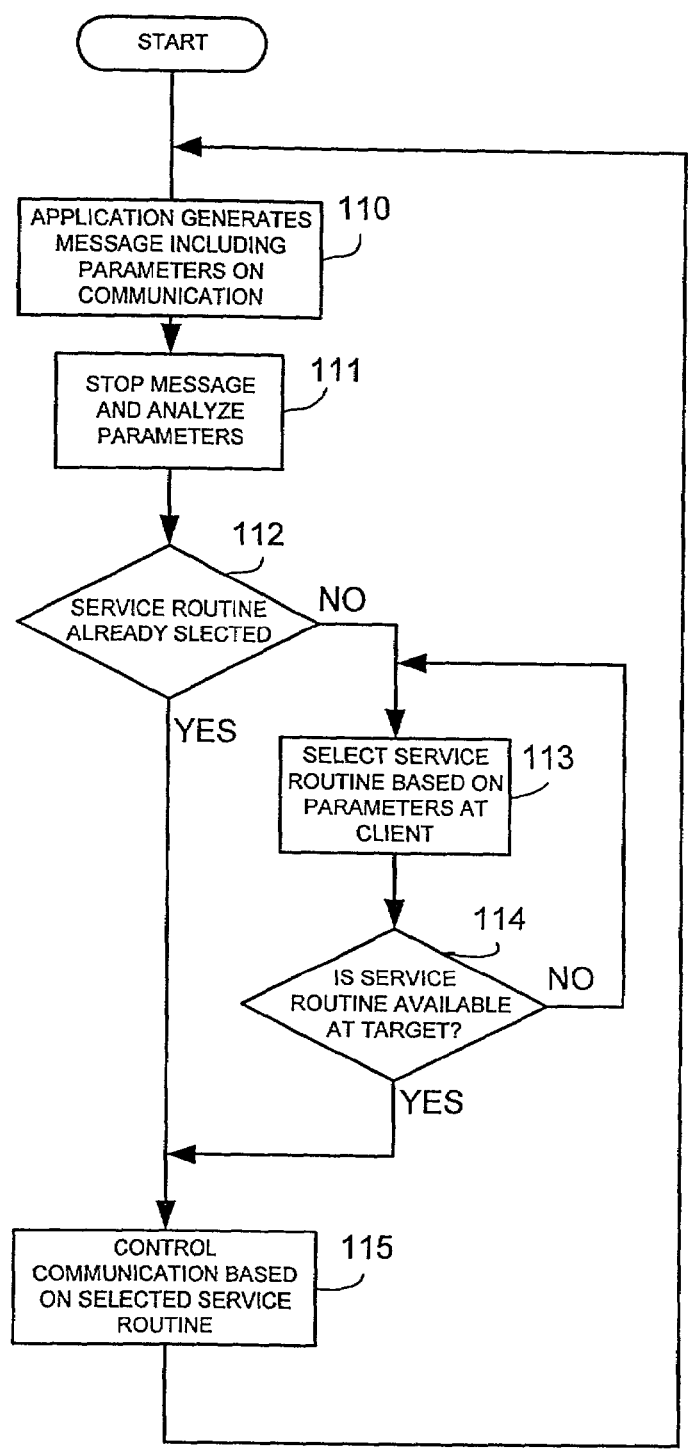
FIG. 4 shows a flow diagram of operation of the invention according to the second embodiment.
Figure 5:
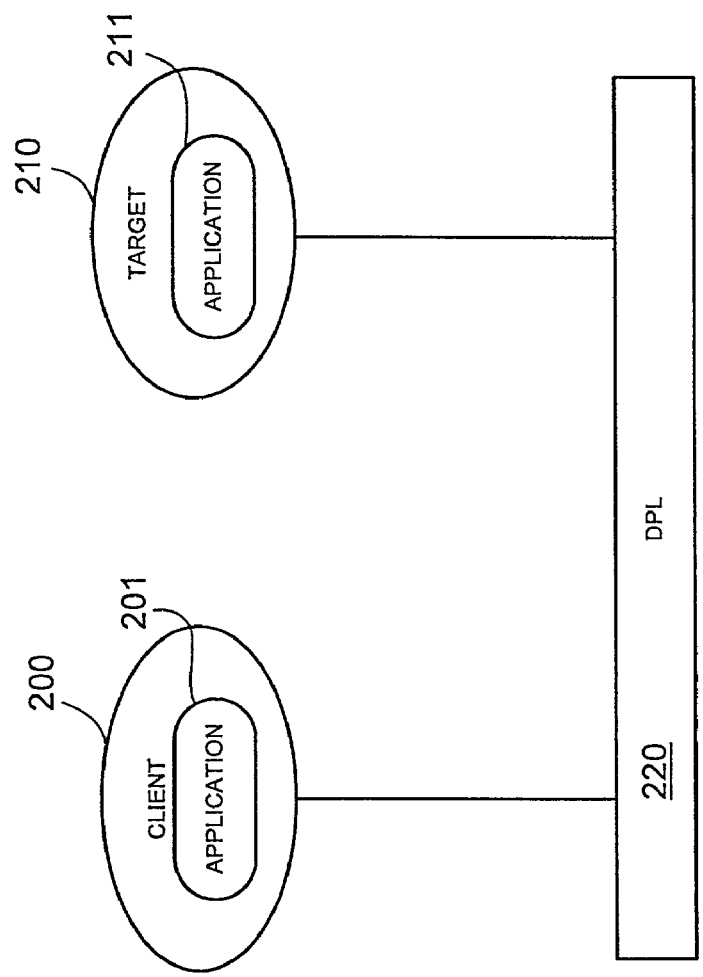
FIG. 5 shows a prior art security service architecture.

In the following, with respect to FIG. 4 a possible sequence of steps during a communication between the client and the target will be described.

At the client an application is running and, in a step 110 the application generates a message including at least parameters on the communication. The parameters may relate to the client, the application itself and the communication state of the application or similar.

In a step 111 the generated message to be transmitted from the client to the target is intercepted and analyzed in order to retrieve the parameters included into the message.

In a step 112 it is checked, whether a service routine or a set of service routines was already selected for the particular application or communication the client and the target are involved in. It may also be checked, whether the application fundamentals or communication fundamentals changed and a new set of service routines needs to be selected. In case no set of service routines was selected or a new set of service routines needs to be selected due to the above reasons, in a step 113 at least one service routine is selected based on the analyzed parameters at the client side.

In a step 114, the client side selection means 51 inquires whether the selected service routine is available at the target, and in case it is not, a new service routine is selected in step 113.

Steps 113 and 114 are repeated until a mutually available service routine or set of service routines could be agreed upon. Thereafter, the flow proceeds to step 115 and the communication is controlled based on the at least one selected service routine.

If in step 112 a service routine or a set of service routines was already selected, or it was determined that a new set of service routines is not required, the flow also proceeds to step 115.

As outlined before, the control of the communication based on the selected at least one service routine may include instructing the underlying distributed platform layer, such as CORBA, to execute available security activities based on instructions from the client side control means and the target side control means.

Further platforms may be, e.g., DCOM which offers a robust object model that especially for Microsoft operating systems; it is ported to other platforms, and OSF (Open Software Foundation) Distributed Computing Environment (DCE) provides a set of standards pioneered by the OSF.

Still further, also the client side control means and target side control means may themselves execute security relevant activities, e.g., encryption or decryption of the message.

The invention claimed is:

1. A security service layer controlling a communication between a client running an application and a target via a communication channel, comprising:
   a message unit generating a message for transmission from the client to the target including parameters specifying the communication,
   an analyzing unit analyzing the parameters of the message,
   a selection unit selecting at least one service routine from a number of available service routines based on the parameters, and
   a control unit controlling the communication including transmission of the message based on the selected at least one service routine, wherein the control unit acts on behalf of the application and allows the application to be security unaware and/or support routine unaware, so as to eliminate contact between the application and the client.

2. The security service layer of claim 1, wherein the selection unit further comprises:
   a client side selection unit located at the client side and connected to a first database storing service routines available at the client,
   a target side selection unit located at the target side and connected to a second database storing service routines available at the target side, and
   wherein the selection of the at least one service routine is based on the availability of service routines at the client and at the target, the availability being determined in a negotiation between the client side selection unit and the target side selection unit prior to transmission of the message.

3. The security service layer of claim 1, wherein the control unit further comprises
   a client side control unit located at the client side, and
   a target side control located at the target side.

4. The security service layer of claim 1, wherein the selection is arranged for selecting the at least one service routine from a group of application independent service routines and application dependent service routines.

5. The security service layer of claim 1, wherein the parameters specify at least one of the client, the target and the application type.

6. The security service layer of claim 1, wherein a service routine includes at least one of security mechanisms and support mechanisms not related to security.

7. The security service layer of claim 1, wherein the service routines relate to controlling at least one of an interface, access to the target, and execution of a processing method.

8. The security service layer of claim 1, wherein the service routines relate to encoding and decoding the message to be transmitted from the client to the target.

9. The security service layer of claim 1, wherein the service routines include information related to the service routine itself, including lifetime and version.

10. The security service layer of claim 1, wherein the message means constitutes part of the application executed at the client, and the message constitutes a request or a notification.

11. A method of controlling a communication between a client running an application and a target via a communication channel, comprising:
    generating a message at the client for transmission from the client to the target including parameters specifying the communication,
    analyzing the parameters of the message,
    selecting at least one service routine from a number of available service routines based on the parameters, and
    controlling the communication including transmission of the message based on the selected at least one service routine,
    wherein the method acts on behalf of the application and allows the application to be security unaware and/or support routine unaware, so as to eliminate contact between the application and the client.

12. The method of claim 11, wherein the selection of the at least one service routine is based on the availability of service routines in a first database at the client side and a second database at the target side, the availability being determined by negotiation between the client side selection unit and target side selection unit prior to transmission of the message from the client to the target.

13. The method of claim 11, wherein the communication is controlled at the client side and the target side.

14. The method of claim 11, wherein the first selection means selects the at least one service routine from a group of application independent service routines and application dependent service routines.

15. The method of claim 11, wherein the parameters specify at least one of the client, the target and the application type.

16. The method of claim 11, wherein a service routine includes at least one of security mechanisms and support mechanisms not related to security.

17. The method of claim 11, wherein the service routines relate to controlling at least one of an interface, access to the target, and execution of a processing method.

18. The method of claim 11, wherein the service routines relate to encoding and decoding the message to be transmitted from the client to the target.

19. The method of claim 11, wherein the service routines include information related to the service routine itself, including lifetime and version.

20. The method of claim 11, wherein the message is generated by the application executed at the client and includes at least one of a request and a notification.

21. A security service layer controlling at least one service routine selected from a number of available service routines based on message parameters when implementing a message for a communication between a client running an application and a target via a communication channel, comprising:

a message unit generating the message for transmission from the client to the target including the message parameters used to select the at least one service routine; and a control unit determining the at least one service routine based on the message parameters and controlling the communication including transmission of the message based on the selected at least one service routine, wherein the control unit acts on behalf of the application and allows the application to be security unaware and/or support routine unaware, so as to eliminate contact between the application and the client.

* * * * *

UNITED STATES PATENT AND TRADEMARK OFFICE
CERTIFICATE OF CORRECTION

PATENT NO.         : 7,140,038 B2
APPLICATION NO. : 09/858900
DATED              : November 21, 2006
INVENTOR(S)        : Rainer Prinoth et al.

Page 1 of 1

It is certified that error appears in the above-identified patent and that said Letters Patent is hereby corrected as shown below:

Col. 14, line 4, after "control" insert --unit--

Col. 14, line 23, change "related" to --relating--

Col. 14, line 53, after "and" insert --at--

Col. 15, line 5, change "related" to --relating--

Signed and Sealed this

Twenty-seventh Day of March, 2007

JON W. DUDAS
*Director of the United States Patent and Trademark Office*